United States Patent [19]

Davis, Jr. et al.

[11] Patent Number: 4,749,518
[45] Date of Patent: Jun. 7, 1988

[54] EXTRACTION OF CESIUM AND STRONTIUM FROM NUCLEAR WASTE

[75] Inventors: Milton W. Davis, Jr., Lexington; Charles B. Bowers, Jr., Columbia, both of S.C.

[73] Assignee: University of South Carolina, Columbia, S.C.

[21] Appl. No.: 763,052

[22] Filed: Aug. 6, 1985

[51] Int. Cl.$^4$ .................. G21C 19/46; C01D 17/00; C01F 1/00
[52] U.S. Cl. ............................ 252/627; 423/2; 423/157; 423/181
[58] Field of Search .................. 423/2, 181, 157; 252/627, 631

[56] References Cited

U.S. PATENT DOCUMENTS

| | | | |
|---|---|---|---|
| 3,914,373 | 10/1975 | Jepson | 423/2 |
| 4,243,637 | 1/1981 | Bradford et al. | 423/10 |
| 4,352,726 | 10/1982 | Sugano et al. | 204/195 M |
| 4,452,702 | 6/1984 | Blasing et al. | 423/181 |
| 4,519,996 | 5/1985 | Knöchel et al. | 423/249 |

OTHER PUBLICATIONS

Gerow et al., "Separation Science and Technology, 16 (#5), 519–548, (1981).
Shuler, "Experimental Measurement of Distribution Coefficients of Pd and Sr from a Synthetic Mixed Fission Prod. Solu.", Thesis, U. S. Cor., 1982.
Antaya et al., Proc. 2nd Word Congress Chem. Eng., vol. II, "Radiation Stability of Organic Extractants ... ", 8 pages, Montreal, (Oct. 4–9, 1981).
Kimura et al., Anal. Chem. 51 (#8), pp. 1113–1116, (Jul. 1979).
Shuler et al., Chem. Abs., 104 (#4), abs. #25,948r.
Tashmukhamedov et al., Chem. Abs., 93 (#23), abs. #216,956j.
Tashmukhamedov et al., Chem. Abs., 90 (#5), abs. #38,893q, (1979).
Antaya, "Cesium Extraction from $HNO_3$ Solution Using Crown Compounds in a Matrix Solution of Didodecylnaphthalene Sulfonic Acid/Tributyl Phosphate/Kerosene", PHD Thesis, U. So. Carolina, (1981).
Gerow, "The Use of Macrocyclic Polyethers to Remove $Cs^{137}$ from Acidic Nuclear Wastes by Solvent Extraction", PHD Thesis, U. So., Carolina, (1979).
Tashmukhamedov et al. (III), "Front. Bioorg. Chem. Mol. Biol., Proc. Int. Symp.", pp. 439–444, (1978), Pergomon, Oxford.

Primary Examiner—Edward A. Miller
Attorney, Agent, or Firm—Brumbaugh, Graves, Donohue & Raymond

[57] ABSTRACT

Cesium is extracted from acidified nuclear waste by contacting the waste with a bis 4,4'(5) [1-hydroxy-2-ethylhexyl]benzo 18-crown-6 compound and a cation exchanger in a matrix solution. Strontium is extracted from acidified nuclear waste by contacting the waste with a bis 4,4'(5') [1-hydroxyheptyl]cyclohexo 18-crown-6 compound, and a cation exchanger in a matrix solution.

8 Claims, 3 Drawing Sheets

PERCENT Cs AND Zr RECOVERED ON SUCCESSIVE BACK CONTACTS FROM 0.05M CROWN XVII IN 5 VOL % (0.1M) NNS, 27 VOL % TBP, AND 68 VOL % KEROSENE USING 0.5M HNO$_3$ AND 1.0M HNO$_3$ AS BACK EXTRACTANTS.

PERCENT Sr, Ba, AND Zr RECOVERED ON SUCCESSIVE BACK CONTACTS FROM 0.02M CROWN XVI IN 5 VOL% (0.1M) NNS, 27 VOL% TBP, AND 68 VOL% KEROSENE USING 0.5M HNO₃ AND 1.0M HNO₃ AS BACK EXTRACTANTS.

EXTRACTION OF CESIUM AND STRONTIUM FROM NUCLEAR WASTE

BACKGROUND OF THE INVENTION

This invention was made with Government support under Contract No. DE-AS09-81SR 10714 awarded by the Department of Energy. The Government has certain rights to this invention.

The present invention relates to a method for extracting cesium and strontium from nuclear waste. Reprocessing of nuclear waste from commercial power reactors offers the opportunity to increase the power available from nuclear fuel, especially when such reprocessing is combined with the use of breeder reactors, and also permits the recovery of potentially valuable fission products such as cesium and strontium. Additionally, the removal of 99.9% of the cesium and strontium from the nuclear waste permits a significant reduction in the relative toxicity of the residual waste if the actinides have also been removed.

Fuel for large nuclear reactors which produce electric power is fabricated by the conversion of slightly enriched uranium hexafluoride ($UF_6$) to uranium dioxide ($UO_2$). Hydrolysis of $UF_6$ and precipitation of compounds such as $(NH_4)_2 U_2 O_7$ is followed by calcination to $U_3O_8$ and reduction with hydrogen to powdered $UO_2$. The uranium dioxide, selected because of its chemical stability, is compacted into pellets that are sintered at high temperatures. The nuclear fuel assembly includes an array of sealed tubes often made of a zirconium alloy which contain the fuel pellets. Many such assemblies are charged into the core of a reactor.

Following the discharge of fuel assemblies that no longer contribute efficiently to the generation of heat in the reactor, the spent fuel is allowed to "cool", that is to dissipate nuclear radiation and the heat generated by it while submerged in water. The spent fuel is processed to recover the residual $^{235}U$ and the plutonium that was formed while the fuel was in the reactor, and to separate the radioactive fission product waste for storage. The processing steps for typical power reactor fuel include disassembly; chopping of the zirconium alloy tubes to expose the fuel; chemical dissolutions of uranium, plutonium, and fission products; and separation and purification of the uranium and plutonium by solvent extraction methods. The resulting waste contains more than 99% of the radioactive fission products and must be handled carefully to ensure confinement and isolation from the biosphere. Vol. 9 McGraw-Hill Encyclopedia of Science and Technology at 278, c. 1982.

The solvent extraction process of the present invention is compatible with the Purex (plutonium uranium reduction and extraction) proces which is used in most reprocessing plants. Uranium and plutonium are reactive metals in the actinide series of elements. The principal isotope of plutonium of nuclear interest is $^{239}Pu$. It is formed in nuclear reactors by the process shown below.

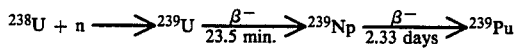

Plutonium exhibits a variety of valence states in solution and in the solid state. The oxidation states III, IV, V and VI are known in acid solutions. The ions of the IV, V and VI states are moderately strong oxidizing agents.

In accordance with the Purex process, the nuclear fuel is dissolved in nitric acid and the oxidation state is adjusted so that the plutonium is present as Pu(IV) and the uranium as U(VI). The nitric acid solution is adjusted and Pu(IV) and U(VI) are extracted into a solution of tri-butyl phosphate (hereinafter "TBP") in an aliphatic hydrocarbon solvent such as kerosene. The TBP phase containing Pu(IV) and U(VI) is scrubbed with nitric acid to remove impurities and the Pu is removed as Pu(III) by back extracting the solvent with nitric acid containing a reducing agent [$NH_2OH$, FE(II) plus sulfamate, U(IV)], or after electrolytic reduction (partition cycle). Both the uranium and plutonium are further purified by one or two additional Purex extractions (second and third decontamination cycles). The waste generated in the process consists of a nitric acid solution of fission products containing very little solids, from which the nitric acid may be recovered by distillation and recycled Vol. 10 McGraw-Hill Encyclopedia of Science and Technology at 563–564, c. 1982.

Cesium-137 ($^{137}Cs$) accounts for a significant amount of the radioactivity of aged liquid waste from nuclear fuel reprocessing. Indeed, $^{137}Cs$ and strontium-90 ($^{90}Sr$) together account for over 99.9% of the relative toxicity of residual waste once the actinide elements have been removed. Relative toxicity is the ratio of the concentration in the waste to the maximum permissible concentration in public zone water.

The amount of $^{137}Cs$ and $^{90}Sr$ which can be obtained from commercial reprocessing as a function of cooling time is shown in FIG. 1. The curves in FIG. 1 were developed by using the ORIGEN-2 Code (CCC 371) which was obtained from the Oak Ridge National Laboratory, and also by using the conditions of operation for a power reactor shown in Table 1 below.

TABLE I

TYPICAL COMMERCIAL POWER REACTOR FUEL AND OPERATIONAL CONDITIONS

| | | |
|---|---|---|
| Fuel | 3.2% | $^{235}U$ |
| Burnup | 33,000 MWD/metric ton | |
| Exposure | 880 days in reactor | |
| Neutron Flux (Specific Power) | $3.24 \times 10^{14}/cm^2$ sec | |
| Cooling Time prior to reprocessing | 10 years | |

A substantial amount of thermal energy can be provided by separating $^{137}Cs$ and $^{90}Sr$ from the remainder of the waste stream. Radiocesium is a source of gamma radiation for municipal waste sterilization prior to reuse as fertilizer or animal food supplements. Radiostrontium is a heat source for use in thermoelectrical power generation in inaccessible locations.

Accordingly, it is an object of the present invention to selectively and reversibly recover $^{137}Cs$ and $^{90}Sr$ from acidic nuclear waste.

SUMMARY OF THE INVENTION

The present invention provides improved solvent systems for the extraction of cesium and strontium from nuclear wastes by utilizing newly developed macrocyclic polyethers.

According to the present invention, cesium is extracted from an acidified solution, such as acidified nuclear waste, using bis 4,4'(5') [1-hydroxy-2-ethylhexyl] benzo 18-crown-6 (Crown XVII)

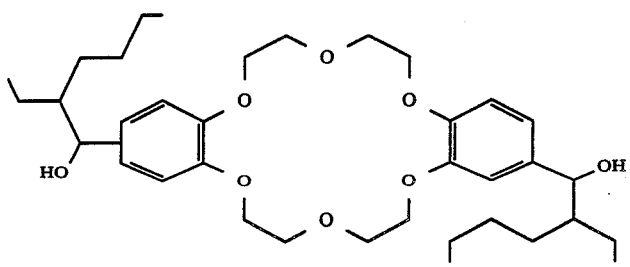

in a matrix solution which includes a cation exchanger, such as dinonylnaphthalene sulfonic acid, tributyl phosphate and kerosene. This same matrix solution is used with bis 4,4', (5') (1-hydroxyheptyl)cyclohexo 18-crown-6 (Crown XVI)

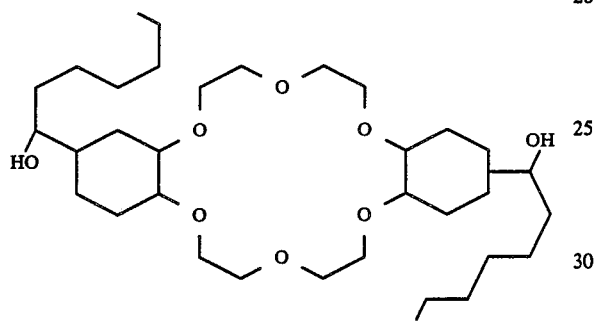

to preferentially extract strontium from acidified solutions, such as acidified nuclear wastes.

DETAILED DESCRIPTION OF THE INVENTION

Figure 1:
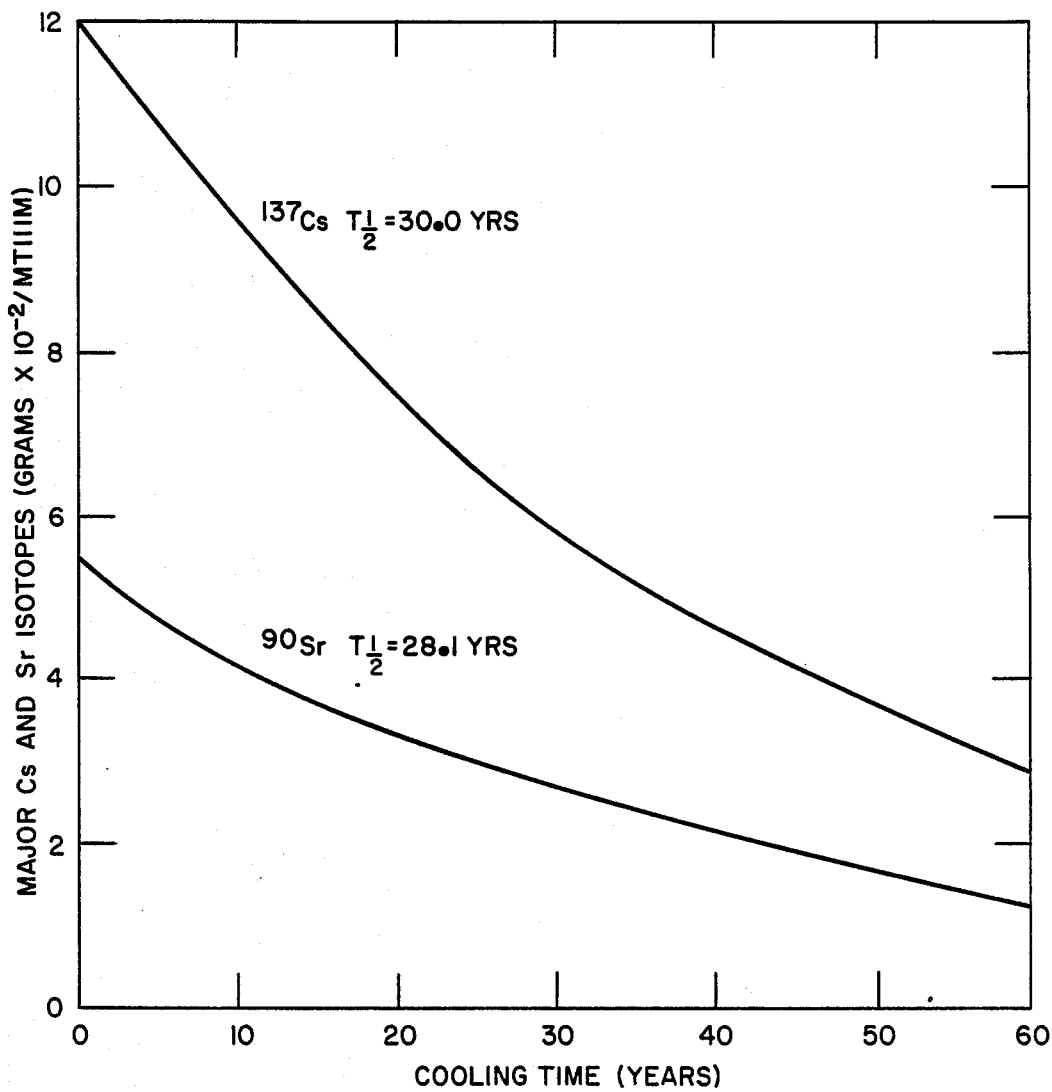
FIG. 1 shows the amount of $^{137}$Cs and $^{90}$Sr that can be obtained from commercial reprocessing as a function of cooling time.

Access to spent nuclear fuel is strictly controlled in the United States. Accordingly, the research which led to the development of the present invention was completed with distribution coefficients obtained from a synthetic mixed fission product solution containing the important elemental species that are understood to be in solution at the conclusion of nuclear fuel dissolution.

The synthetic solution was defined by using the ORIGEN-2 Code (CCC 371) from the Oak Ridge National Laboratory and run in accordance with the commercial fuel conditions shown in Table I as a basis for the reprocessing solution. In the standard Purex process, the dissolver solution is usually adjusted so that the concentration of HNO$_3$ is approximately 3M and the concentration of uranyl nitrate is from 1.2M to 1.4M. The relative abundance of each fission product in a standard Purex process dissolver solution was calculated based on a dissolver solution containing 1.4M uranyl nitrate in 3M HNO$_3$, and is shown in Table II.

TABLE II

STANDARD DISSOLVER SOLUTION COMPOSITION EXCLUDING ACID

| ELEMENT | 10 yr. COOLING WGT.* (GRAMS) METRIC TON U) | ATOMIC WEIGHT of FISSION PRODUCTS | MOLARITY BASIS: 1.4 M U |
|---|---|---|---|
| Rb | 352.5 | 86.2927 | 0.001424 |
| Sr | 778.6 | 89.0080 | 0.003048 |
| Y | 426.0 | 88.9059 | 0.001670 |
| Zr | 3,506.0 | 93.2846 | 0.013097 |
| Mo | 3,337.0 | 97.5414 | 0.011922 |
| Ru | 2,179.0 | 101.9611 | 0.007448 |
| Rh | 467.2 | 102.9055 | 0.001582 |
| Pd | 1,371.0 | 105.8351 | 0.004514 |
| Ag | 76.29 | 108.9048 | 0.000244 |
| Cd | 107.9 | 112.40 | 0.000335 |
| Sn | 89.97 | 118.69 | 0.000264 |
| Te | 483.6 | 129.4307 | 0.001302 |
| I | 234.3 | 128.4308 | 0.000636 |
| Cs | 2,334.0 | 134.7124 | 0.006038 |
| Ba | 1,482.69 | 137.4486 | 0.003759 |
| La | 1,216.0 | 138.9061 | 0.003051 |
| Ce | 2,365.0 | 140.8596 | 0.005851 |
| Pr | 1,116.0 | 140.9076 | 0.002760 |
| Nd | 4,025.0 | 144.8626 | 0.009683 |
| Pm | 10.58 | 146.9151 | 0.000025 |
| Sm | 860.4 | 149.3357 | 0.002008 |
| Eu | 130.8 | 153.0600 | 0.000298 |
| Gd | 117.0 | 155.9222 | 0.000261 |
| U | 956,200.0 | 238.0167 | 1.400000 |
| Pu | 8,686.0 | 239.6351 | 0.012632 |
| Total | 991,952.83 | | |

*Data obtained from the decay of high-level PWR-Uranium waste using the ORIGEN-2 Code.

The synthetic solution which was prepared for use in the process of the present invention did not include the gaseous components in Table II, or those elements with a molarity less than 0.001. Moreover, uranium and plutonium were omitted from the synthetic solution since it was presumed that the actinides would be recovered from the dissolver solution before recovery of the fission products. Since molyhdenum nitrate and molybdenum trioxide have very limited solubility in water or HNO$_3$, it was presumed that most of the molybdenum would be removed from the dissolver solution as solid material by treatment prior to solvent extraction, and accordingly, molybdenum was also not included in the synthetic solution. The composition of the synthetic solution which was used in the process of the invention is shown in Table III.

TABLE III

SYNTHETIC FISSION PRODUCT SOLUTION EXCLUDING ACID

| ELEMENT | MOLARITY* BASIS: 1.4 M U |
|---|---|
| Te | 0.001302 |
| Ru | 0.007448 |
| Pd | 0.004514 |

TABLE III-continued

SYNTHETIC FISSION PRODUCT
SOLUTION EXCLUDING ACID

| ELEMENT | MOLARITY* BASIS: 1.4 M U |
|---|---|
| Rh | 0.001582 |
| Zr | 0.013097 |
| Y | 0.001670 |
| La | 0.003051 |
| Nd | 0.009683 |
| Ce | 0.005851 |
| Pr | 0.002760 |
| Sr | 0.003048 |
| Sm | 0.002008 |
| Ba | 0.003759 |
| Rb | 0.001424 |
| Cs | 0.006038 |

*Initially 3 M HNO₃

Most of the metals used in preparing the synthetic solution were available as the nitrate and could be dissolved in water or 3M $HNO_3$ at room temperature (25° C.). Zirconium nitrate and tellurium dioxide were dissolved in hot concentrated $HNO_3$. Rhodium oxide pentahydrate and ruthenium nitroso nitrate were dissolved in 3M $HNO_3$ at room temperature. All other salts were sufficiently soluble in water at room temperature.

In preparation of the synthetic solution, the Zr and Te were first dissolved in concentrated $HNO_3$ as described above. The appropriate amounts of the other salts dissolved in deionized water were then added. The final mixture of the synthetic dissolver solution used in developing the present invention had the composition shown in Table III in 3M $HNO_3$. The extractability of the individual species in the dissolver solution was determined at 25° C. in a matrix solution of tributyl phosphate (TBP) and kerosene in a volumetric ratio of 0.43 TBP/kerosene. The matrix solution also contained organic cation exchangers and crown compounds to increase extractability. Distribution coefficients of the fission products between nitric acid and the TBP/kerosene matrix alone are shown in Table IV.

TABLE IV

DISTRIBUTION COEFFICIENTS OF FISSION
PRODUCTS BETWEEN AQUEOUS NITRIC ACID*
AND 30 VOL % TBP/70 VOL % KEROSENE
TEMPERATURE = 25° C.

| ELEMENT** | DISTRIBUTION COEFFICIENT (ORG/AQ) |
|---|---|
| Te | 0.00 |
| Ru | 0.04 |
| Pd | 0.09 |
| Rh | 0.01 |
| Zr | 0.06 |
| Y | 0.05 |
| La | 0.02 |
| Nd | 0.04 |
| Ce | 0.02 |
| Pr | 0.03 |
| Sr | 0.00 |
| Sm | 0.07 |
| Ba | 0.00 |
| Rb | 0.01 |
| Cs | 0.01 |

*Initially 3 M HNO₃
**See Table III for Initial molarity

Extracts of the synthetic dissolver solution were analyzed for metals using Inductively Coupled Plasma Spectrometry or, in the case of rubidium and cesium, Flame Atomic Emission Spectrometry. Emission wavelengths were selected for each element to minimize or completely avoid spectral interferences from other elements.

The efficiency of extraction for each element was determined as a distribution coefficient, the ratio of the concentration of an element in the organic phase to its concentration in the aqueous phase. In evaluating a material for use in the organic phase, it is important not only to get a large distribution coefficient for the desired material, but also to retain low values for other materials. This differential shift in the distribution coefficients is indicative of the selectivity of the extractant.

The use of macrocyclic polyethers (hereinafter "crown compounds"), as additional complexing agents for alkali metals and alkaline earth metals was suggested by C. J. Pedersen and H. K. Frendorff in "Macrocylic Polyethers and Their Complexes", Angew. Chem. Intro. Ed. Engl. 2, 16 (1972). Crown ethers are able to increase the solubility of alkali metal salts in non-polar organic solvents. Specific metal complexes are formed by the crown ethers with alkali metal cations, the specificity for a given cation depending upon the size of the hole in the middle of the crown ether structure. Vol. 5 McGraw-Hill Encyclopedia of Science and Technology at 204, c. 1982.

Antaya et al. used a matrix solution consisting of 5 vol % didodecylnaphthalene sulfonic acid in a 27 vol % TBP and 68 vol % kerosene solution containing bis 4,4',(5') [1-hydroxyheptyl] benzo 18-crown-6 (Crown IX)

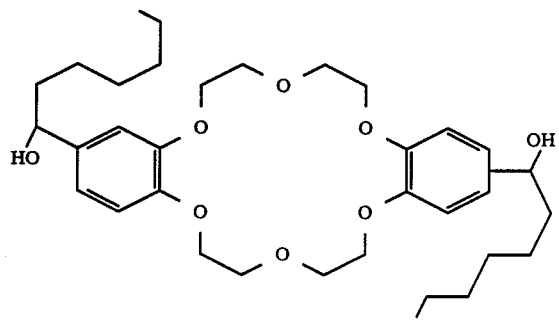

to extract cesium from 3M $HNO_3$. Proceedings of the Second World Congress on Chemical Engineering, Vol. II, Montreal, Canada, Oct. 4–9, 1981. Crown IX, however, has limited solubility in the TBP/kerosene matrix solution which limits its utility.

Selective strontium extraction has been reported with a DNS, TBP and kerosene matrix using a saturated macrocyclic polyether. Bis 4,4',(5') diheptylcyclohexo 18-crown-6 (Crown XVIII)

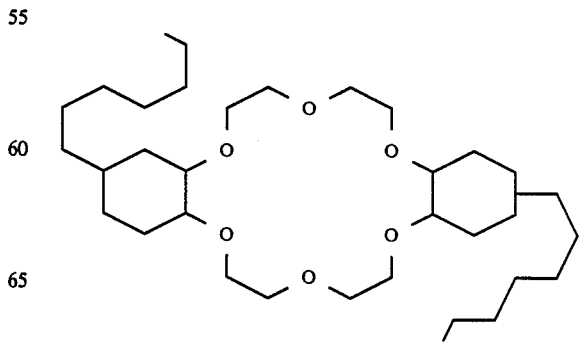

has been used for the extraction of strontium from acidic solutions. Separation Science and Technology, 16(5), (1981).

Extraction of Cesium

Cesium can be extracted from 3M $HNO_3$ to a very limited extent by a solution of 30 vol % TBP and 70 vol % kerosene. This extraction is only marginally improved by the addition of a cation exchanger such as didodecylnaphthalene sulfonic acid (DNS) or dinonylnaphthalene sulfonic acid (NNS). Addition of Crown IX leads to an improved selective extraction of cesium. The maximum utility of Crown IX is limited, however, by a maximum solubility of around 0.028M in 50 vol % TBP in kerosene.

According to the present invention, it is possible to achieve superior extraction efficiencies for cesium without sacrificing selectivity. Cesium is extracted using a matrix solution containing a cation exchanger, tributyl phosphate and kerosene. Preferably, the matrix solution contains 5 vol % cation exchanger solution, 27 vol % TBP and 68 vol % kerosene. The macrocyclic polyether, bis 4,4',(5') benzo 18-crown-6 (Crown XVII) is added to enhance the extracting ability of the organic solvent. Crown XVII is available from Parish Chemical Co., Orem, Utah. The preferred concentration for Crown XVII is 0.05M, although higher concentrations can be used to achieve higher distribution coefficients.

Following the extraction of the cesium from the dissolver solution, cesium can be back extracted from the organic phase. Water followed by 1M $HNO_3$ can be used for stripping the cesium in several stripping steps. Preferably, the stripping steps are all performed with nitric acid.

EXAMPLE 1

Synthetic dissolver solution was contacted with 30 vol % TBP/70 vol % kerosene; 5 vol % DNS (0.08M) or NNS (0.10M)/27 vol % TBP/68 vol % kerosene; 5 vol % DNS (0.08M) or NNS (0.10M)/27 vol % TBP/68 vol % kerosene/0.02M Crown IX; and 5 vol % DNS (0.08M) or NNS (0.10M)/27 vol % TBP/68 vol % kerosene/0.05M Crown XVII. The distribution coefficient was determined for each element extracted by each solvent system. The results of this study are shown in Table V.

TABLE V

DISTRIBUTION COEFFICIENTS OF FISSION PRODUCTS BETWEEN AQUEOUS 3 M NITRIC ACID AND CROWN COMPOUNDS IN 5 VOL % ORGANIC CATION EXCHANGER, 27 VOL % TBP, AND 68 VOL % KEROSENE TEMPERATURE = 25° C.

| | DISTRIBUTION COEFFICIENT CROWN MOLARITY | | | | | |
|---|---|---|---|---|---|---|
| | 0.0 M | | 0.02 M CROWN IX | | 0.05 CROWN XVII | |
| | CATION EXCHANGER | | | | | |
| ELEMENT* | DNS 0.08 M | NNS 0.10 M | DNS 0.08 M | NNS 0.10 M | DNS 0.08 | NNS 0.10 M |
| Te | 0.00 | 0.03 | 0.00 | 0.00 | 0.00 | 0.06 |
| Ru | 0.18 | 0.23 | 0.15 | 0.18 | 0.21 | 0.31 |
| Pd | 0.03 | 0.07 | 0.04 | 0.09 | 0.09 | 0.22 |
| Rh | 0.00 | 0.03 | 0.00 | 0.02 | 0.02 | 0.16 |
| Zr | 1.64 | 2.82 | 1.38 | 2.56 | 1.67 | 2.09 |
| Y | 0.06 | 0.04 | 0.01 | 0.06 | 0.05 | 0.09 |
| La | 0.06 | 0.09 | 0.01 | 0.08 | 0.06 | 0.09 |
| Nd | 0.06 | 0.09 | 0.05 | 0.09 | 0.08 | 0.17 |
| Ce | 0.05 | 0.08 | 0.02 | 0.06 | 0.09 | 0.08 |
| Pr | 0.05 | 0.08 | 0.03 | 0.08 | 0.09 | 0.16 |
| Sr | 0.00 | 0.00 | 0.00 | 0.00 | 0.06 | 0.16 |
| Sm | 0.07 | 0.09 | 0.04 | 0.08 | 0.10 | 0.14 |
| Ba | 0.00 | 0.00 | 0.00 | 0.02 | 0.06 | 0.03 |
| Rb | 0.00 | 0.01 | 0.05 | 0.05 | 0.29 | 0.29 |
| Cs | 0.03 | 0.01 | 0.56 | 0.50 | 1.44 | 1.59 |

*Distribution coefficients of these fission products between 3 M $HNO_3$ and 30 vol % TBP and 70 vol % kerosene containing no other metal complexing agents are shown in Table IV.

The use of Crown XVII clearly enhances the distribution coefficient of Cs significantly. Approximately 60% of the cesium is extracted into the organic phase (distribution coeff. = 1.59) when Crown XVII is used, as opposed to approximately 33% (distribution coeff. = 0.5) when Crown IX is used.

It should be noted from the data that DNS or NNS containing matrix solvent acts as an efficient extraction solvent for zirconium in the absence of a macrocyclic polyether. Thus, if the separation of zirconium from cesium or strontium is critical, a pre-extraction to remove zirconium could be carried out.

No other elements display the significant increase in distribution coefficient observed for cesium using the solvent system according to the present invention. Thus, the solvent system achieves a high degree of selectivity for cesium extraction.

EXAMPLE 2

The enhanced solubility of Crown XVII allows the use of this compound at concentrations higher than those achievable using Crown IX. Organic solutions containing increasing concentrations of Crown XVII in the presence of DNS or NNS in 27 vol % TBP/68 vol % kerosene matrix solvent were used to contact the synthetic dissolver solution. The measured distribution coefficients are shown in Table VI.

TABLE VI

Temperature = 25° C.
Distribution Coefficients for Extraction of Fission Products from Synthetic Dissolver Solutions at Varying Concentrations of Crown XVII In 5 vol % Organic Cation Exchanger, 27 vol % TBP, and 68 vol % Kerosene

| | Molarity of Crown XVII | | | | | | |
|---|---|---|---|---|---|---|---|
| | DNS 0.00 M | DNS 0.02 M | DNS 0.05 M | DNS 0.075 M | NNS 0.00 M | NNS 0.05 M | NNS 0.10 M |
| Te | 0.00 | 0.00 | 0.00 | 0.00 | 0.03 | 0.06 | 0.00 |
| Ru | 0.18 | 0.16 | 0.21 | 0.22 | 0.23 | 0.31 | 0.22 |
| Pd | 0.03 | 0.05 | 0.09 | 0.09 | 0.07 | 0.22 | 0.08 |
| Rh | 0.00 | 0.02 | 0.02 | 0.00 | 0.03 | 0.06 | 0.02 |
| Zr | 1.64 | 1.54 | 1.67 | 1.10 | 2.82 | 2.09 | 1.97 |
| Y | 0.06 | 0.04 | 0.05 | 0.03 | 0.04 | 0.09 | 0.01 |
| La | 0.06 | 0.04 | 0.06 | 0.02 | 0.09 | 0.09 | 0.01 |
| Nd | 0.06 | 0.06 | 0.08 | 0.05 | 0.09 | 0.17 | 0.05 |
| Ce | 0.05 | 0.06 | 0.09 | 0.04 | 0.08 | 0.08 | 0.04 |
| Pr | 0.05 | 0.05 | 0.09 | 0.03 | 0.08 | 0.16 | 0.05 |
| Sr | 0.00 | 0.03 | 0.06 | 0.03 | 0.00 | 0.06 | 0.00 |
| Sm | 0.07 | 0.07 | 0.10 | 0.07 | 0.09 | 0.14 | 0.05 |
| Ba | 0.00 | 0.06 | 0.06 | 0.06 | 0.00 | 0.03 | 0.02 |
| Rb | 0.00 | 0.07 | 0.29 | 0.44 | 0.01 | 0.29 | 0.76 |
| Cs | 0.03 | 0.34 | 1.44 | 2.29 | 0.01 | 1.59 | 5.64 |

The data show that increasing concentrations of Crown XVII further increase the distribution coefficient without significantly affecting the selectivity. By using higher concentrations of Crown XVII, much higher distribution coefficients can be achieved than those achievable using the less soluble Crown IX.

EXAMPLE 3

Figure 2:
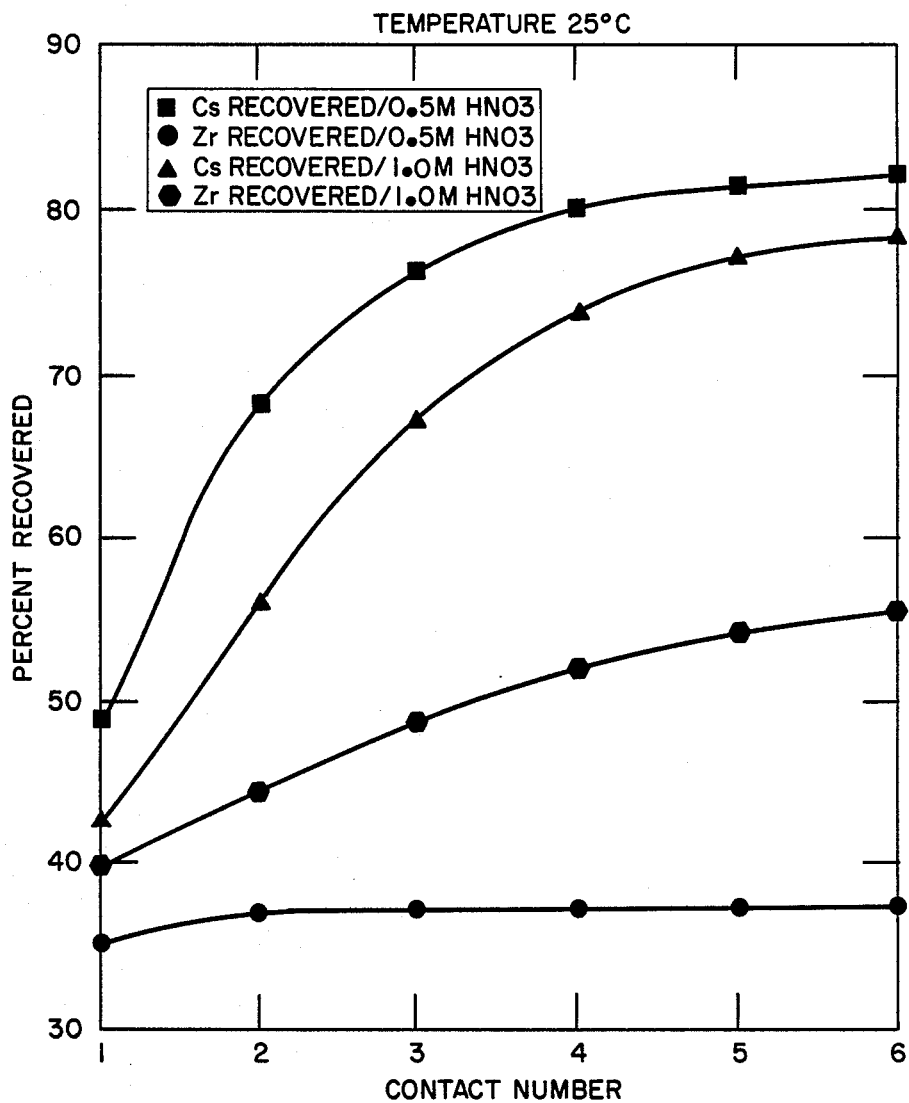
FIG. 2 shows the percent recovery of Cs and Zr on successive back-extractions with 0.5M HNO$_3$ and 1.0M HNO$_3$.

Cesium and zirconium were recovered from an extraction solvent composed of 5 vol % NNS (0.10M), 27 vol % TBP and 68 vol % kerosene 0.5M and 1.0M $HNO_3$ used as back-extractants. FIG. 2 shows the percent recovery of each element after successive contacts with the back-extractant. More than 80% of the cesium can be recovered after four contacts with 0.5M $HNO_3$.

Extraction of Strontium

As shown in Table V, strontium is not extracted from dissolver solutions by DNS/TBP/kerosene or NNS/TBP/kerosene solvents in the absence of a macrocyclic polyether. Crown IX and Crown XVII do facilitate some extraction of strontium, but not to any significant extent. Similarly, prior art extractants of strontium such as Crown XVIII do not achieve outstanding results.

According to the present invention, significant improvements in extraction efficiency for strontium can be achieved using bis 4,4',(5') cyclohexo 18-crown-6 (Crown XVI). Crown XVI is available from Parish Chemical Co., Orem, Utah. Barium is also extracted along with the strontium, but selectivity relative to the other elements remains. The extraction solvent is composed of a cation exchanger, tributyl phosphate, and kerosene plus Crown XVI. Preferably, 5 vol % NNS (0.10M), 27 vol % TBP, and 68 vol % kerosene is used with at least 0.02M Crown XVI.

Following the extraction of strontium and barium from the dissolver solution, strontium and barium can be backextracted from the organic phase using dilute $HNO_3$ or using one water extraction followed by $HNO_3$ extractions. Preferably, the stripping is entirely performed with dilute $HNO_3$.

EXAMPLE 4

Synthetic dissolver solution was contacted with 5 vol % NNS (0.10M), 27 vol % TBP, and 68 vol % kerosene containing 0.05M Crown XVI or 0.05M Crown XVIII. Distribution coefficients were measured for each element in each solvent system. The results are shown in Table VII.

TABLE VII

DISTRIBUTION COEFFICIENTS OF FISSION PRODUCTS BETWEEN AQUEOUS 3 M NITRIC ACID AND 5 VOL % NNS 27 VOL % TBP, AND 68 VOL % KEROSENE CONTAINING 0.05 M CROWN XVI OR 0.05 M CROWN XVIII
TEMPERATURE = 25° C.

| | DISTRIBUTION COEFFICIENT | |
|---|---|---|
| ELEMENT | 0.05 M CROWN XVI | 0.05 M CROWN XVIII |
| Te | 0.00 | 0.03 |
| Ru | 0.26 | 0.29 |
| Pd | 0.05 | 0.11 |
| Rh | 0.02 | 0.04 |
| Zr | 1.41 | 2.06 |
| Y | 0.02 | 0.03 |
| La | 0.04 | 0.07 |
| Nd | 0.03 | 0.09 |
| Ce | 0.06 | 0.06 |
| Pr | 0.03 | 0.07 |
| Sr | 3.84 | 0.14 |
| Sm | 0.03 | 0.06 |
| Ba | 4.20 | 0.22 |
| Rb | 0.11 | 0.01 |
| Cs | 0.03 | 0.05 |

The use of Crown XVI clearly enhances the extraction efficiency for strontium, removing approximately 80% of the strontium to the organic phase. Crown XVI is not entirely selective, since it also acts to enhance the extraction of barium, but no other elements are significantly enhanced.

EXAMPLE 5

Crown XVI was tested in NNS/TBP/kerosene matrix solvent at various concentrations to observe the level of strontium extraction achievable. The distribution coefficients measured are shown in Table VIII. Nearly 90% strontium extraction (distribution coeff.=6.36) can be achieved in 0.10M Crown XVI. Under these conditions, however, a three-phase system is produced. This concentration was still within the limits of the solubility of Crown XVI, so it is possible that adjustments to the organic phase would eliminate the formation of the three-phase system. Good extraction efficiency was observed at 0.02M Crown XVI as well. Barium was coextracted at all concentrations of Crown XVI.

TABLE VIII

DISTRIBUTION COEFFICIENTS OF FISSION PRODUCTS BETWEEN AQUEOUS 3 M NITRIC ACID AND 5 VOL % NNS, 27 VOL % TBP, AND 68 VOL % KEROSENE WITH VARYING CONCENTRATIONS OF CROWN XVI
TEMPERATURE = 25° C.

| | DISTRIBUTION COEFFICIENT MOLARITY OF CROWN XVI | | | |
|---|---|---|---|---|
| ELEMENT | 0.00 M | 0.02 M | 0.05 M | 0.10 M |
| Te | 0.03 | 0.00 | 0.00 | 0.00 |
| Ru | 0.23 | 0.16 | 0.26 | 0.21 |
| Pd | 0.07 | 0.09 | 0.05 | 0.13 |
| Rh | 0.03 | 0.03 | 0.02 | 0.00 |
| Zr | 2.82 | 1.99 | 1.41 | 0.62 |
| Y | 0.04 | 0.00 | 0.02 | 0.00 |
| La | 0.09 | 0.06 | 0.04 | 0.00 |
| Nd | 0.09 | 0.12 | 0.03 | 0.00 |
| Ce | 0.08 | 0.06 | 0.06 | 0.00 |
| Pr | 0.08 | 0.06 | 0.03 | 0.00 |
| Sr | 0.00 | 1.98 | 3.84 | 6.36 |
| Sm | 0.09 | 0.10 | 0.03 | 0.02 |
| Ba | 0.00 | 2.43 | 4.20 | 4.03 |
| Rb | 0.01 | 0.07 | 0.11 | 0.38 |
| Cs | 0.01 | 0.00 | 0.03 | 0.36 |

EXAMPLE 6

Figure 3:
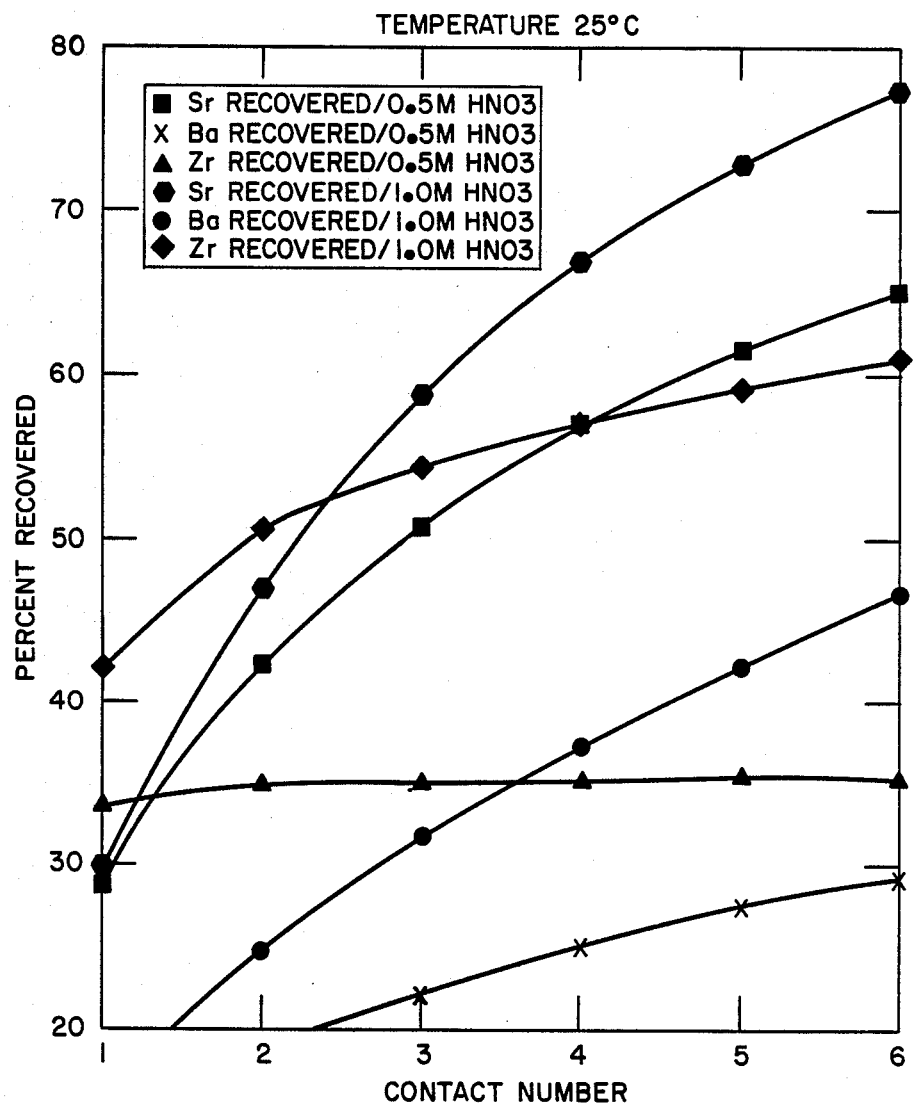
FIG. 3 shows the precent recovery of Sr, Ba and Zr on successive back-extractions with 0.5M HNO$_3$ and 1.0M HNO$_3$.

Strontium, barium and zirconium were recovered from an extraction solvent composed of 0.02M Crown XVI in 5 vol % NNS (0.10M), 27 vol % TBP and 68 vol % kerosene. 0.5M and 1.0M $HNO_3$ were used as back-extractants. FIG. 3 shows the percent recovery of each element after successive contacts with the back-extractants. 0.5M $HNO_3$ is better suited for use as a back-extractant as higher levels of strontium recovery are achieved.

EXAMPLE 7

Radiation Stability of Crown Compounds

In order to have utility in the extraction of nuclear wastes, the crown compounds must be stable to radiation. Tests were conducted on Crown XVI and Crown XVII in 5 vol % NNS solution/27 vol % TBP/68 vol % kerosene. Radiation exposure was done by exposing both the organic and aqueous phases when in contact to a $^{60}Co$ gamma radiation source. The radiation exposure was varied from $0.2 \times 10^7$ rad to $1.0 \times 10^7$ rad in a $0.4 \times 10^7$ rad/hr source Distribution coefficients were measured for each element after various exposure times. The results are shown in Tables IX and X. Some decrease is observed in the distribution coefficients of cesium and strontium with increasing exposure. Despite this slight decrease, however, the components are sufficiently stable for use in this application. Distribution coefficients increase for zirconium with increasing exposure, although the reason for this is not understood.

TABLE IX

DISTRIBUTION COEFFICIENTS OF FISSION PRODUCTS BETWEEN AQUEOUS 3 M NITRIC ACID AND 0.02 M CROWN XVI IN 5 VOL % (0.1 M) NNS, 27 VOL % TBP, AND 68 VOL % KEROSENE AFTER EXPOSURE TO COBALT-60 GAMMA RADIATION
TEMPERATURE = 25° C.

| | DISTRIBUTION COEFFICIENT EXPOSURE, RAD × $10^7$ | | | | | |
|---|---|---|---|---|---|---|
| ELEMENT | 0.0 | 0.2 | 0.4 | 0.6 | 0.8 | 1.0 |
| Te | 0.00 | 0.00 | 0.01 | 0.00 | 0.01 | 0.00 |
| Ru | 0.16 | 0.21 | 0.28 | 0.20 | 0.29 | 0.21 |
| Pd | 0.09 | 0.12 | 0.23 | 0.16 | 0.29 | 0.21 |
| Rh | 0.03 | 0.05 | 0.08 | 0.01 | 0.03 | 0.02 |
| Zr | 1.99 | 2.16 | 2.31 | 2.49 | 2.62 | 3.02 |
| Y | 0.00 | 0.01 | 0.01 | 0.00 | 0.02 | 0.00 |
| La | 0.06 | 0.07 | 0.06 | 0.05 | 0.04 | 0.04 |
| Nd | 0.12 | 0.13 | 0.15 | 0.10 | 0.06 | 0.09 |
| Ce | 0.06 | 0.07 | 0.06 | 0.04 | 0.07 | 0.06 |
| Pr | 0.06 | 0.06 | 0.07 | 0.04 | 0.06 | 0.05 |
| Sr | 1.98 | 1.86 | 1.82 | 1.59 | 1.56 | 1.56 |
| Sm | 0.10 | 0.10 | 0.12 | 0.08 | 0.07 | 0.07 |
| Ba | 2.43 | 2.38 | 2.31 | 2.23 | 2.07 | 2.48 |
| Rb | 0.07 | 0.07 | 0.06 | 0.05 | 0.05 | 0.07 |
| Cs | 0.00 | 0.00 | 0.00 | 0.00 | 0.01 | 0.00 |

TABLE X

DISTRIBUTION COEFFICIENTS OF FISSION PRODUCTS BETWEEN AQUEOUS 3 M NITRIC ACID AND 0.05 M CROWN XVII IN 5 VOL % (0.1 M) NNS, 27 VOL % TBP, AND 68 VOL % KEROSENE AFTER EXPOSURE TO COBALT-60 GAMMA RADIATION
TEMPERATURE = 25° C.

| | DISTRIBUTION COEFFICIENT EXPOSURE, RAD × $10^7$ | | | | | |
|---|---|---|---|---|---|---|
| ELEMENT | 0.0 | 0.2 | 0.4 | 0.6 | 0.8 | 1.0 |
| Te | 0.06 | 0.02 | 0.05 | 0.01 | 0.03 | 0.02 |
| Ru | 0.31 | 0.31 | 0.34 | 0.30 | 0.30 | 0.28 |
| Pd | 0.22 | 0.25 | 0.29 | 0.28 | 0.32 | 0.37 |
| Rh | 0.06 | 0.04 | 0.05 | 0.04 | 0.04 | 0.03 |
| Zr | 2.09 | 2.26 | 2.28 | 2.66 | 2.87 | 3.21 |
| Y | 0.09 | 0.07 | 0.08 | 0.04 | 0.06 | 0.05 |
| La | 0.09 | 0.06 | 0.06 | 0.05 | 0.06 | 0.06 |
| Nd | 0.17 | 0.12 | 0.13 | 0.12 | 0.12 | 0.09 |
| Ce | 0.08 | 0.09 | 0.10 | 0.05 | 0.07 | 0.07 |
| Pr | 0.16 | 0.11 | 0.14 | 0.10 | 0.11 | 0.12 |
| Sr | 0.06 | 0.03 | 0.03 | 0.02 | 0.02 | 0.01 |
| Sm | 0.14 | 0.10 | 0.12 | 0.09 | 0.09 | 0.09 |
| Ba | 0.03 | 0.02 | 0.04 | 0.02 | 0.04 | 0.06 |
| Rb | 0.29 | 0.26 | 0.25 | 0.22 | 0.20 | 0.21 |
| Cs | 1.59 | 1.38 | 1.32 | 1.16 | 1.08 | 1.04 |

While representative applications and embodiments of the invention have been described, those skilled in the art will recognize that many variations and modifications of such embodiments may be made without departing from the spirit of the invention, and it is intended to claim all such variations and modifications as fall within the true scope of the invention.

We claim:

1. In a method for reprocessing nuclear waste, wherein the waste is dissolved in acidic solution and the actinides are removed, the improvement comprising separating cesium from the waste by contacting the waste with an extractant consisting essentially of bis 4,4',(5') benzo 18-crown-6, together with a sulfonic acid cation exchanger in a matrix solution.

2. The improvement of claim 1, wherein the cation exchanger is dinonylnaphthalene sulfonic acid.

3. The improvement of claim 1, wherein the matrix solution comprises tributyl phosphate and kerosene.

4. In a method for reprocessing nuclear waste, wherein the waste is dissolved in acidic solution and the actinides are removed, the improvement comprising separating strontium from the waste by extracting the waste with an extractant consisting essentially of bis 4,4'(5') (1-hydroxyheptyl) cyclohexo 18-crown-6, together with a sulfonic acid cation exchanger in a matrix solution.

5. The improvement of claim 4, wherein the cation exchanger is dinonylnaphthalene sulfonic acid.

6. The improvement of claim 4, wherein the matrix solution comprises tributyl phosphate and kerosene.

7. The improvement of claim 1, wherein the cation exchanger is didodecylnapthalene sulfonic acid.

8. The improvement of claim 4, wherein the cation exchanger is didodecylnaphthalene sulfonic acid.

* * * * *

UNITED STATES PATENT AND TRADEMARK OFFICE
CERTIFICATE OF CORRECTION

PATENT NO.   :   4,749,518
DATED        :   June 7, 1988
INVENTOR(S)  :   Milton W. Davis, Jr., et al.

It is certified that error appears in the above-identified patent and that said Letters Patent is hereby corrected as shown below:

Column 1, line 56, "proces" should read --process--;

Column 2, line 21, insert a period after "recycled";

Column 4, line 52, "molyhdenum" should read --molybdenum--;

Column 7, line 53, before "benzo" insert --[1-hydroxy-2-ethylhexyl]--;

Column 9, line 31, insert a period after "kerosene":

Column 9, line 32, before "used" insert --were--;

Column 9, line 48, before "cyclohexo" insert --[1-hydroxy-2-ethylhexyl]--.

Signed and Sealed this

Tenth Day of January, 1989

Attest:

DONALD J. QUIGG

*Attesting Officer*          *Commissioner of Patents and Trademarks*